United States Patent
Amini et al.

(10) Patent No.: US 7,526,565 B2
(45) Date of Patent: Apr. 28, 2009

(54) MULTIPLE DESCRIPTION HINTING AND SWITCHING FOR ADAPTIVE MEDIA SERVICES

(75) Inventors: Lisa Amini, Yorktown Heights, NY (US); Pascal Frossard, Bulle (CH); Olivier Verscheure, Harrison, NY (US); Peter Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 10/406,715

(22) Filed: Apr. 3, 2003

(65) Prior Publication Data

US 2004/0199653 A1     Oct. 7, 2004

(51) Int. Cl.
*G06F 15/16* (2006.01)
(52) U.S. Cl. ..................... 709/231; 709/247
(58) Field of Classification Search .............. 709/231, 709/217, 233, 224, 247
See application file for complete search history.

(56) References Cited

U.S. PATENT DOCUMENTS

| | | | |
|---|---|---|---|
| 5,847,760 A | 12/1998 | Elmaliach et al. | |
| 5,953,506 A * | 9/1999 | Kalra et al. | 709/231 |
| 6,128,649 A * | 10/2000 | Smith et al. | 709/217 |
| 6,151,636 A * | 11/2000 | Schuster et al. | 709/247 |
| 6,397,230 B1 * | 5/2002 | Carmel et al. | 715/210 |
| 6,490,627 B1 * | 12/2002 | Kalra et al. | 709/231 |
| 6,574,609 B1 | 6/2003 | Downs et al. | 705/50 |
| 6,587,837 B1 | 7/2003 | Spagna et al. | 705/26 |
| 6,628,300 B2 * | 9/2003 | Amini et al. | 345/660 |
| 6,754,266 B2 * | 6/2004 | Bahl et al. | 375/240.01 |
| 6,775,652 B1 * | 8/2004 | Cox et al. | 704/236 |
| 6,813,270 B1 * | 11/2004 | Oz et al. | 370/394 |

(Continued)

FOREIGN PATENT DOCUMENTS

WO          WO 99/00984          1/1999

(Continued)

OTHER PUBLICATIONS

Venkatramani et al, "Securing Media for Adaptive Streaming", Proceedings of the eleventh ACM international conference on Multimedia, 2003, pp. 307-310.*

(Continued)

*Primary Examiner*—Douglas B Blair
(74) *Attorney, Agent, or Firm*—F. Chau & Associates, LLC (57) ABSTRACT

A system and method for streaming data over a communications network with varying streaming conditions, includes conditioning a data stream to create conditioned data representations including encoded representations targeting running conditions, wherein conditioning includes partitioning the data stream into data units, and generating the encoded representations of each of the data units, packaging the conditioned data representations with metadata specifying a target set of running conditions, wherein the conditioned data representations are packaged by pre-computing one or more trajectories among the encoded representations based on a given finite set of streaming conditions, observing a current run-time condition and selecting one of the packaged conditioned data representations for streaming over the computing network according to the running conditions in view of the current run-time condition in accordance with the observed current streaming condition, and a communications network responsive to the media server for streaming the selected packaged conditioned data representation.

14 Claims, 10 Drawing Sheets

U.S. PATENT DOCUMENTS

| | | | |
|---|---|---|---|
| 6,816,901 B1* | 11/2004 | Sitaraman et al. | 709/225 |
| 6,886,042 B1* | 4/2005 | Watahiki et al. | 709/232 |
| 6,973,475 B2* | 12/2005 | Kenyon et al. | 709/203 |
| 7,031,259 B1* | 4/2006 | Guttman et al. | 370/235 |
| 7,039,189 B1* | 5/2006 | Kienzle et al. | 380/239 |
| 7,216,288 B2* | 5/2007 | Westerink et al. | 715/201 |
| 7,228,535 B2* | 6/2007 | Frossard et al. | 717/158 |
| 7,249,264 B2* | 7/2007 | Belknap et al. | 713/189 |
| 7,277,956 B2* | 10/2007 | Horen et al. | 709/231 |
| 7,280,658 B2* | 10/2007 | Amini et al. | 380/45 |
| 7,283,966 B2* | 10/2007 | Zhang et al. | 704/500 |
| 7,305,486 B2* | 12/2007 | Ghose et al. | 709/232 |
| 7,313,236 B2* | 12/2007 | Amini et al. | 380/42 |
| 7,395,355 B2* | 7/2008 | Afergan et al. | 709/247 |
| 2002/0069218 A1 | 6/2002 | Sull et al. | 707/501.1 |
| 2003/0099298 A1* | 5/2003 | Rose et al. | 375/240.27 |
| 2004/0039836 A1* | 2/2004 | Wee et al. | 709/231 |
| 2004/0068652 A1* | 4/2004 | Carpentier et al. | 713/168 |
| 2004/0117828 A1* | 6/2004 | Parker et al. | 725/46 |
| 2004/0162910 A1* | 8/2004 | Kryeziu | 709/231 |
| 2006/0156201 A1* | 7/2006 | Zhang et al. | 714/776 |

FOREIGN PATENT DOCUMENTS

WO   WO 00/72601   11/2000

OTHER PUBLICATIONS

Verscheure et al, "Join Server Scheduling and Proxy Caching for Video Delivery", Computer Communications, vol. 24, No. 4, Mar. 2002, pp. 413-423.*

Amini et al, "ARMS: Adaptive Rich Media Secure Streaming", http://citeseer.ist.psu.edu/631511.html, Nov. 2-8, 2003.*

European International Search Report.

* cited by examiner

MULTIPLE DESCRIPTION HINTING AND SWITCHING FOR ADAPTIVE MEDIA SERVICES

BACKGROUND

Media compression and delivery provide an indispensable modality for multimedia communications. Various applications exist, including digital TV, video on demand, video e-mail, videophone, video conferencing, and rich media e-learning. These applications have been exemplified most prominently by the IP-based World Wide Web and wireless communications services. Faster development and wider deployment of rich media communications is foreseen for the near future, as higher access bandwidth through cable and digital subscriber loop modems become available, server and network load is reduced through large-scale deployment of IP multicast, and the backbone bandwidth increases.

Unfortunately, unlike more traditional networks such as ISDN, which may provide a guaranteed quality of service ("QoS") for connections, both the IP-based Internet and wireless networks are relatively unreliable. Currently, they offer no QoS guarantees. QoS-guaranteed transmission for all rich media streams is infeasible and may remain so for a long time owing to technical and economical constraints. Unavoidable packet loss, bit error, burst error, delay, and jitter make the effective transmission of rich media over such lossy networks a challenging task. These network characteristics influence the transmission of compressed bit streams, alter the nature of the end-to-end quality, and essentially call for renewed design of the rich media delivery system.

Thus, it is desirable that a media server be able to adapt the content to the current conditions. Adaptive media services are the focus of the present disclosure. For example, if a client requests the progressive delivery of a video sequence over a lossy wireless channel, the media server should adapt the streamed content to both varying packet loss ratios and available channel rates. This adaptation would yield a better user experience. It is especially desirable that such an adaptation should not require tremendous processing power at the media server, which is the case for typical online transcoding techniques.

SUMMARY

According to an embodiment of the present disclosure, a method of streaming data over a communications network with varying streaming conditions, said method comprising conditioning a data steam to generate a plurality of conditional data representations of the data stream, wherein the conditioned data representations comprise different encoded representations of source data of the data stream each targeting a different set of running conditions, wherein conditioning comprises partitioning the data stream into a plurality of data units, and generating the different encoded representations of each of the data units of the data stream, packaging the plurality of conditioned data representations of the data stream together with metadata that specifies a target set of running conditions associated with the different encoded representations of the data stream, wherein the conditioned data representations are packaged by pre-computing one or more trajectories among the plurality of different encoded representations for each of the data units based on a given finite set of streaming conditions, observing a current run-time condition of a computing network, and dynamically selecting one of the packaged conditioned data representations for streaming over the computing network according to the running conditions specified in the metadata of the packaged conditioned data representations in view of the current run-time condition of the computing network.

BRIEF DESCRIPTION OF THE DRAWINGS

The present disclosure teaches a system and method for Multiple Description Hinting and Switching for Adaptive Media Services in accordance with the following exemplary figures, in which.

DETAILED DESCRIPTION OF PREFERRED EMBODIMENTS

A system and method for Multiple Description Hinting and Switching for Adaptive Media Services are provided. In the description that follows, the following terms are pre-defined:

Access Unit: An access unit is a media unit to which embodiments of the present disclosure apply, such as, for example, video pictures in a video sequence or audio frames in a sound track.

Description: A description is a compressed access unit that is ready to be delivered by a server.

Description Properties: A vector of properties relative to a particular description, the vector denoted by "p". This vector describes a particular description in a way that is compliant with a specific implementation or embodiment of the present disclosure.

Running Conditions: A vector of actual conditions to which a server must adapt, the vector denoted by "xc".

Embodiments of the present disclosure attach a piece of information or "metadata" to every single description. This metadata characterizes a description in terms of the description's properties in a way that is compatible with the implementation of a Description Selection algorithm. A media server analyzes the metadata of all the descriptions pertaining to the access unit under consideration, and decides which description(s) to send depending on the observed and/or calculated running conditions xc. That is, there are no predefined trajectories among the different descriptions. Instead, the media server picks at every time instant or access unit duration the most appropriate description(s) with property p such that |x(p)−xc| is minimum under pre-established constraints.

Figure 1:
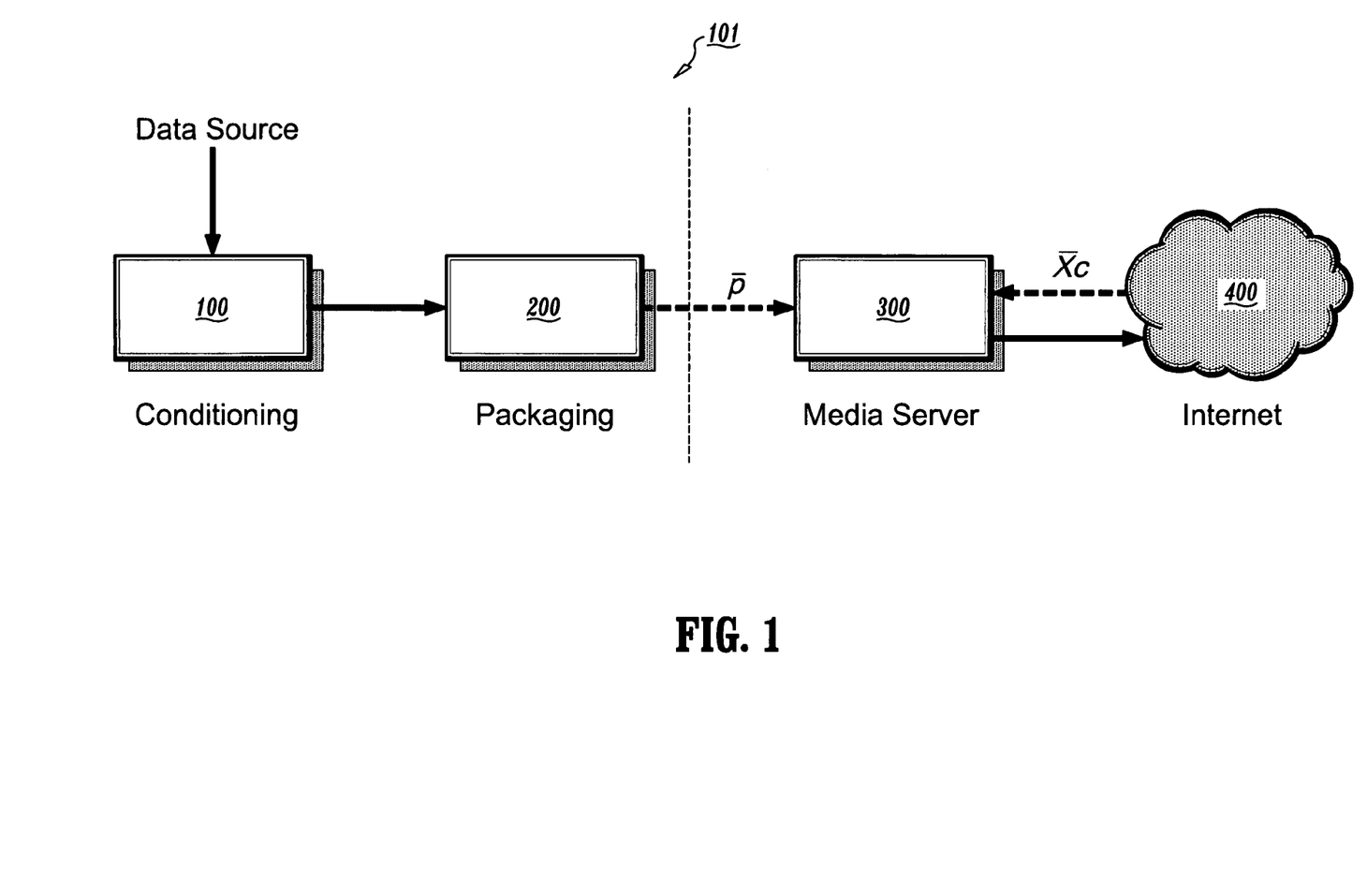
FIG. 1 shows a schematic block diagram for a system according to a preferred embodiment of the present disclosure.

As shown in FIG. 1, a system embodiment of the present disclosure is indicated generally by the reference numeral 101. The system 101 includes a Conditioning tool 100 for receiving data, a Packaging tool 200 in signal communication with the Conditioning tool 100, and a media server 300 in signal communication with the Packaging tool 200 and an Internet 400. The Conditioning tool 100 takes source data in and splits the source data into a series of data units (e.g., a video stream may be split into a series of video frames). The Conditioning tool then creates multiple versions of each data unit, with possibly a variable number of versions per data unit, given a set of expected running conditions.

Figure 2:
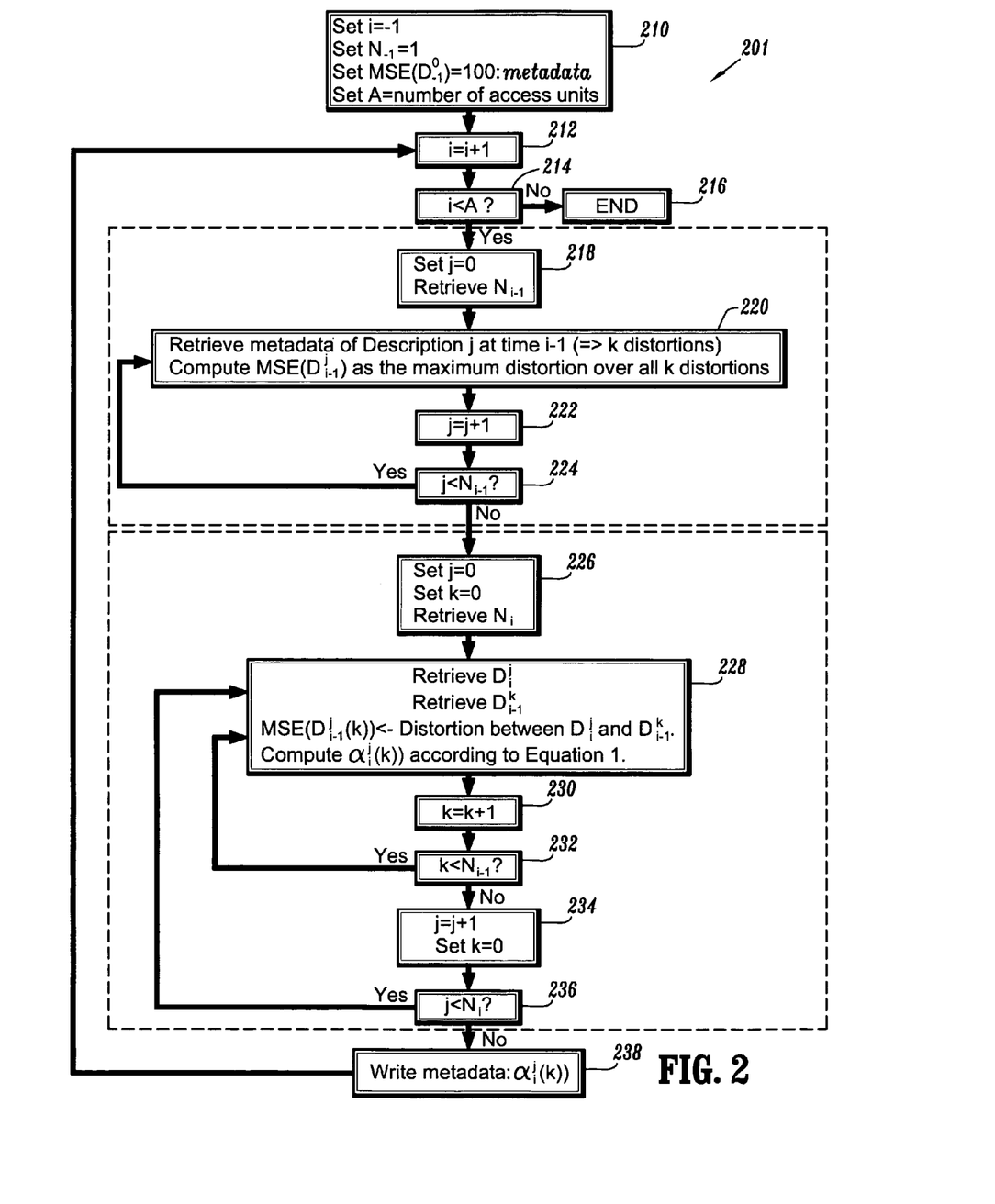
FIG. 2 shows a flow diagram for packaging in accordance with FIG. 1.

Turning to FIG. 2, a flow diagram for packaging in accordance with FIG. 1 is indicated generally by the reference numeral 201. An initialiaztion block 210 passes control to a counter block 212, which, in turn, passes control to a decision block 214. The decision block 214 checks whether the counter has reached the number of access units, and if so, passes control to an end block 216. If the counter has not reached the number of access units, it passes control to a loop initialization block 218, which, in turn, passes control to a function block 220. The function block 220 retrieves metadata of a description according to a local loop counter at a time corresponding that tracked by the counter block 212, and computes a maximum distortion. An internal loop counter block 222 receives control from the block 220, increments the local loop counter, and passes control to a decision block 224. The decision block 224 checks whether the local loop counter is less than a limit, and if so, passes control back to the function block 220.

Control is passed to a loop initialization block 226 if the block 224 determines that the local loop counter has reached the limit. The loop initialization block 226, in turn, passes control to a function block 228 that retrieves two descriptions, checks whether a previously computed distortion is less than the distortion between the two retrieved descriptions, and computes a value alpha. The function block 228 passes control to a counter block 230, which increments an inner loop counter, and, in turn, passes control to a decision block 232. The decision block 232 checks whether the inner loop counter is less than a limit, and if so, passes control back to the function block 228. If the decision block 232 finds that the inner loop counter has reached the limit, control is passed to an outer counter block 234, which, in turn, passes control to a decision block 236. The block 236 checks whether the outer loop counter is less than a limit, and if so, it passes control back to the function block 228. If the decision block 236 determines that the outer loop counter has reached the limit, it passes control to a write block 238. The write block 238, in turn, writes the metadata alpha and passes control back to the counter block 212.

Thus, the Packaging tool 200 packages the various versions into a file, such as on disk, and attaches metadata such that a streaming server can effortlessly determine the most appropriate trajectory among these versions to target current observed running conditions (i.e., xc in FIG. 1).

Figure 3:
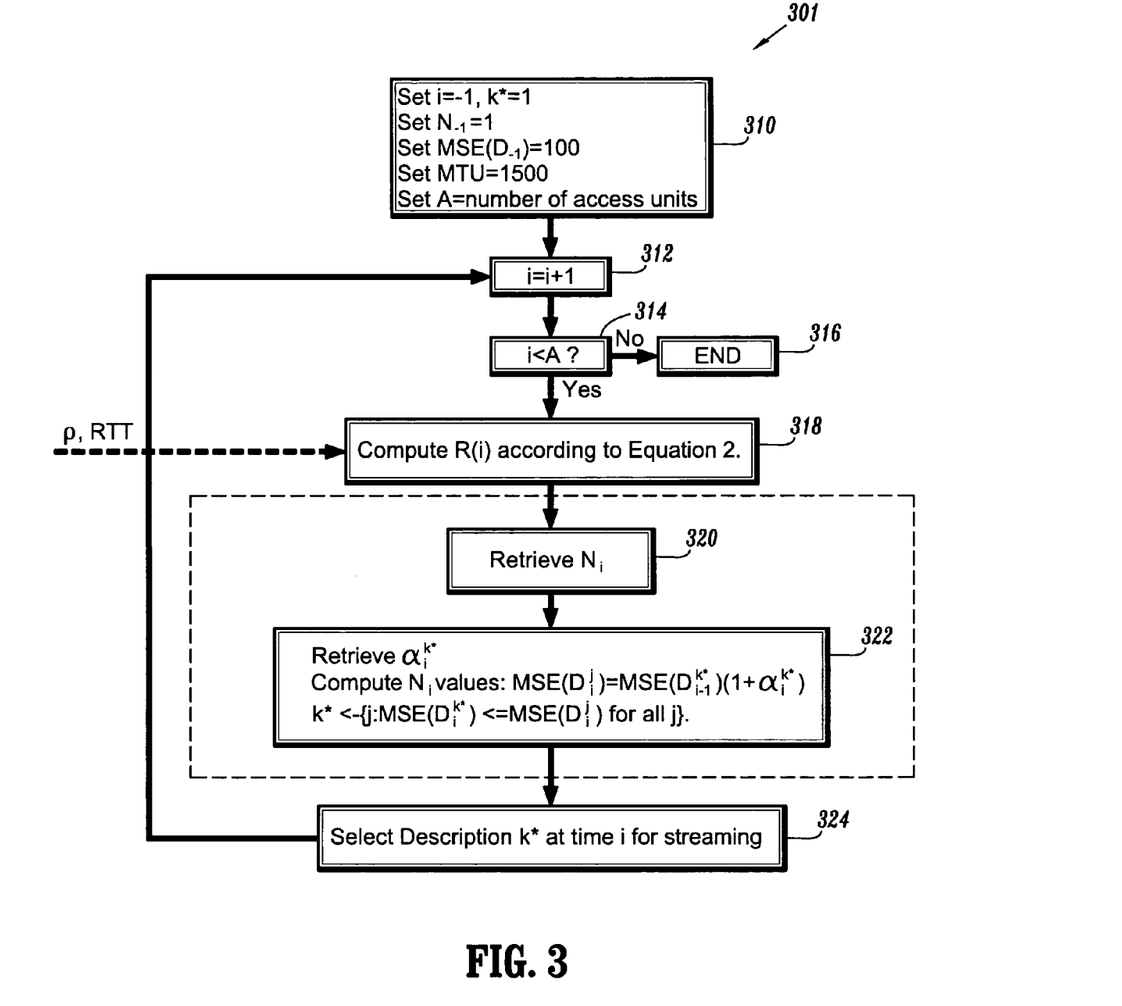
FIG. 3 shows a flow diagram for streaming, given metadata from packaging, in accordance with FIG. 1.

Turning now to FIG. 3, a flow diagram for streaming, given metadata from packaging in accordance with FIG. 1, is indicated generally by the reference numeral 301. Here, an initialization block 310 passes control to a counter block 312, which, in turn, passes control to a decision block 314. The decision block 314 checks whether the counter is less than the number of access units, and if not, passes control to and end block 316. If the counter is still less than the number of access units, control is passes to a function block 318 to compute a running constraint R. The function block 318 passes control to a retrieval block 320 to retrieve the current limit Ni, and, in turn, pass control to a function block 322. The function block 322 retrieves the current alpha and computes Ni distortion values for the description. A function block 324 receives control from the function block 322, selects a description corresponding to the current counter time value for streaming, and passes control back to the counter block 312.

Thus, a Streaming Server 300 periodically measures the current running conditions xc from the System 400 over which the packaged data may flow. A customer comes in and requests the data previously conditioned and packaged. The Streaming Server thereby reads data from the packaged data, retrieves the various versions at time t along with the attached metadata, and computes the most appropriate subset of versions to send at time t given xc for all times t between time 0 and time T (i.e., the end of the packaged data).

Figure 4:
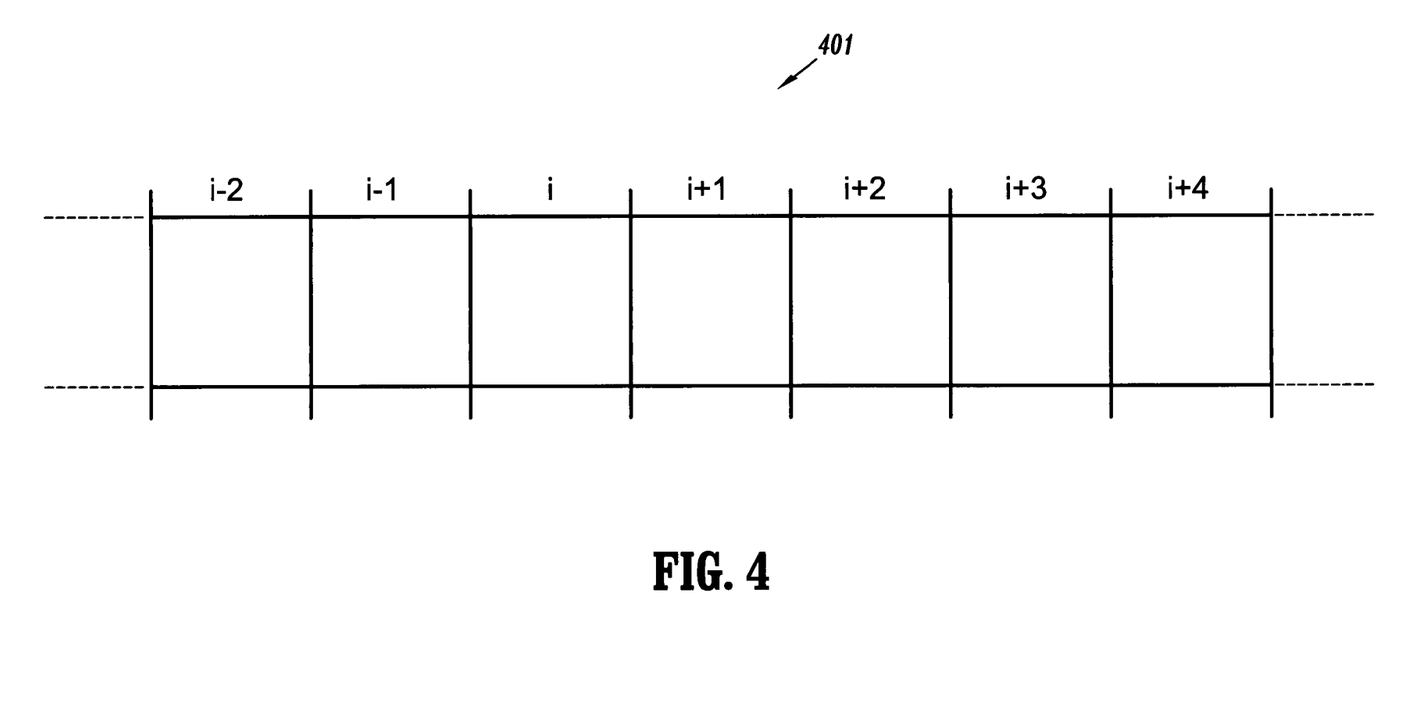
FIG. 4 shows a schematic set of sequential descriptions, where each description is a compressed access unit that is ready to be delivered by a server and, for example, the descriptions from i−2 to i+4 could represent the compressed video frames of a video clip.

As shown in FIG. 4, a schematic set of sequential descriptions is indicated generally by the reference numeral 401. Here, for example, the descriptions from i−2 to i+4 could represent the compressed video frames of a video clip. Every access unit has one and only one description to create a typical single encoding of a media stream. For example, if an uncompressed video clip is composed of 100 frames or access units, compressing this video clip results in each video frame being compressed once, thereby resulting in 100 descriptions for a one-to-one mapping. A file containing these 100 descriptions is then loaded on a media server.

Figure 5:
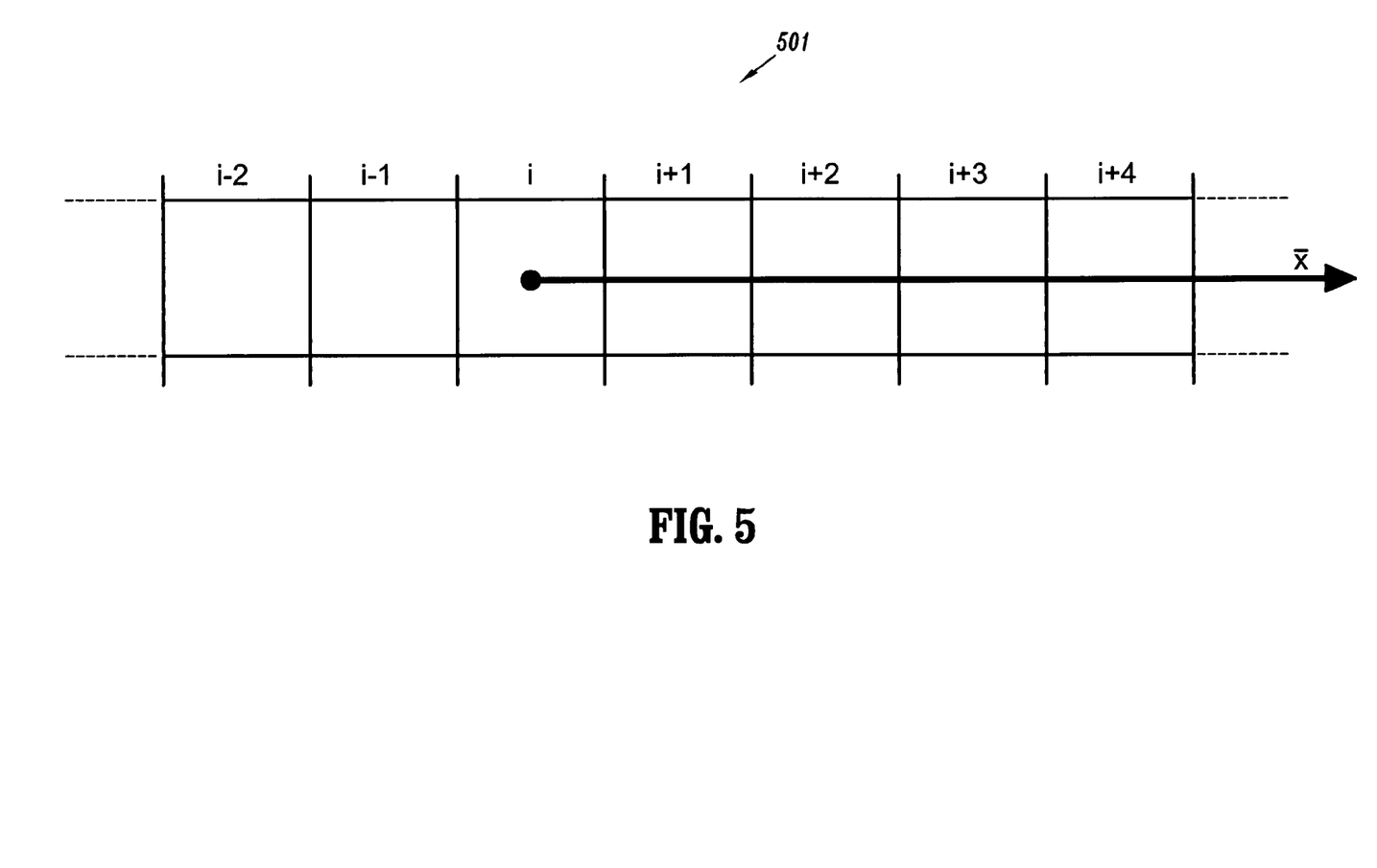
FIG. 5 shows a schematic set of sequential descriptions with one description per access unit, where a media server sends these descriptions sequentially whatever the observed and/or computed running conditions xc are, which may result in perceptual degradation with amplitude proportional to |x−xc|.

Turning to FIG. 5, a schematic set of sequential descriptions with one description per access unit is indicated generally by the reference numeral 501. A media server sends these descriptions sequentially whatever the observed and/or computed running conditions xc are, which may result in perceptual degradation with amplitude proportional to |x−xc|.

The media server sends the descriptions when playback is requested. Since a description results from digitally compressing an access unit, the compression parameters (e.g., CODEC, bit rate) directly affect the descriptions' properties (e.g., size, distortion). Thus a sequential set of descriptions optimally targets one and only one set of running conditions xc. We denote by x the running conditions a set of sequential descriptions targets.

Figure 7:
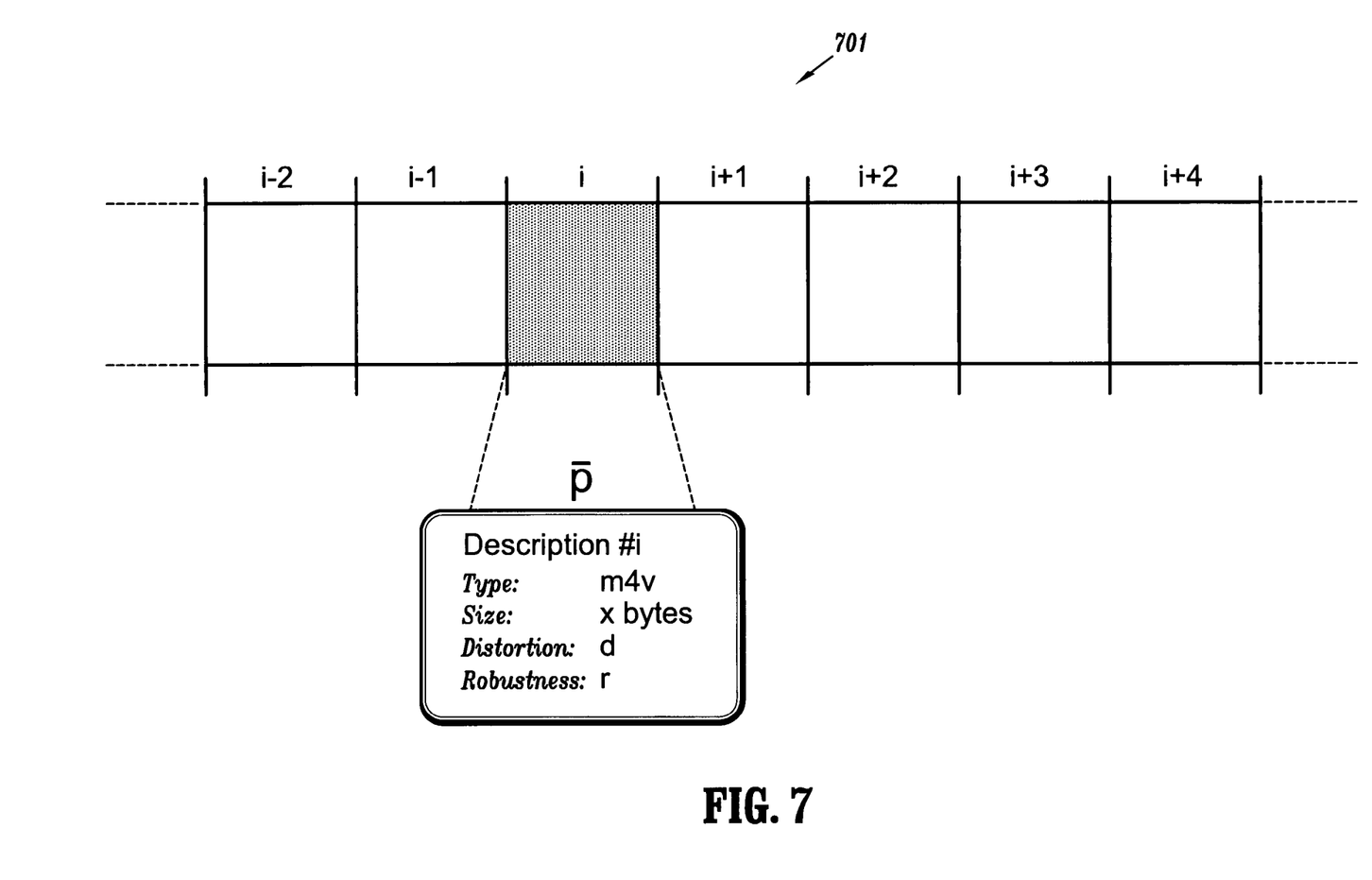
FIG. 7 shows a schematic set of sequential descriptions, where description i is described by its properties p, and where the listed properties (i.e. type, size, distortion, robustness) are merely exemplary.

Turning out of sequence to FIG. 7, a schematic set of sequential descriptions, where description i is described by its properties p, is indicated generally by the reference numeral 701. Here, the listed properties (e.g., type, size, distortion, robustness) are merely exemplary. The x strongly depends on the encoding properties p. Presentation quality is degraded when a media server sends descriptions targeting x under actual running conditions xc whenever x is different than xc.

Due to the best effort nature of IP networks, x different than xc is a common scenario. Others have identified this problem and have brought different solutions.

A first solution was to capture every unique description before it was actually sent over the network and to perform some processing on it (e.g., a transcoding algorithm). While this solution provided a fine-grained scalability property (one could make |x−xc| as small as possible), it also resulted in tremendous processing requirements, and thereby dramatically reduced the number of concurrent streams the media server was capable of handling. Another solution created multiple descriptions per access unit. The present disclosure builds on this paradigm.

Figure 6:
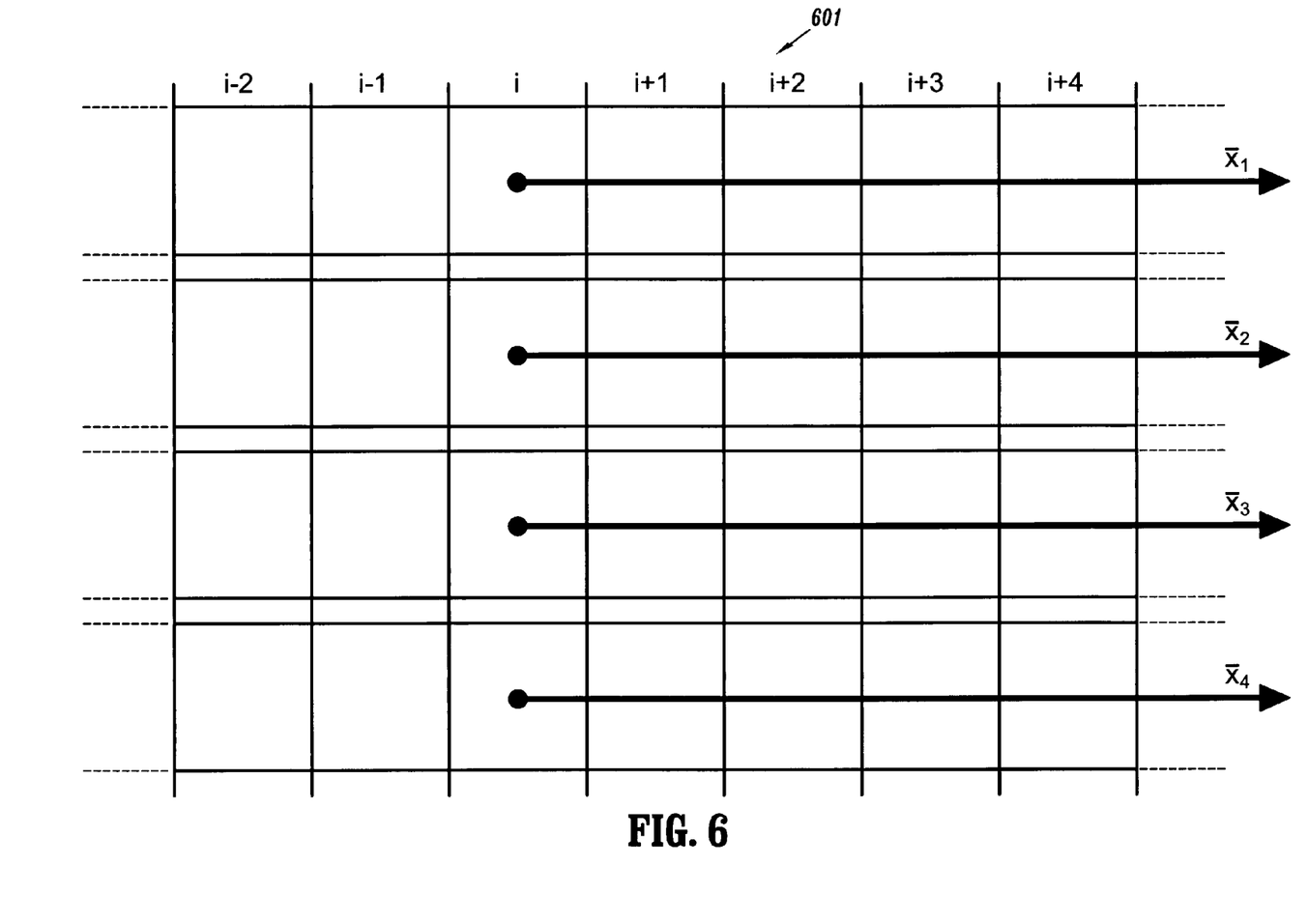
FIG. 6 shows a schematic set of discrete target running conditions $xc_i$, such as for Sure-Streaming from Real Networks.

Turning now to FIG. 6, a schematic set of discrete target running conditions $xc_i$, such as for Sure-Streaming from Real Networks, is indicated generally by the reference numeral 601. Existing implementations rely on a discrete set of target running conditions $x_i$ (e.g., Sure-Streaming from Real Networks). FIG. 6 graphically depicts the idea. Multiple descriptions per access unit (four in the Figure) are created such that four distinct sets of descriptions exactly target running conditions $x_1$, $x_2$, $x_3$ and $x_4$. The media server observes and/or calculates the running conditions xc and may decide to switch to a different distinct set of descriptions $x_i$ (i={0, 1, 2, 3} in the Figure). This solution requires a negligible amount of extra processing power, but the level of granularity for adaptation has a direct impact on storage space.

Embodiments of the present disclosure combine advantages of both worlds. That is, the embodiments provide a generic framework by which fine-grained scalability may be achieved at a negligible impact on the required processing power.

Figure 8:
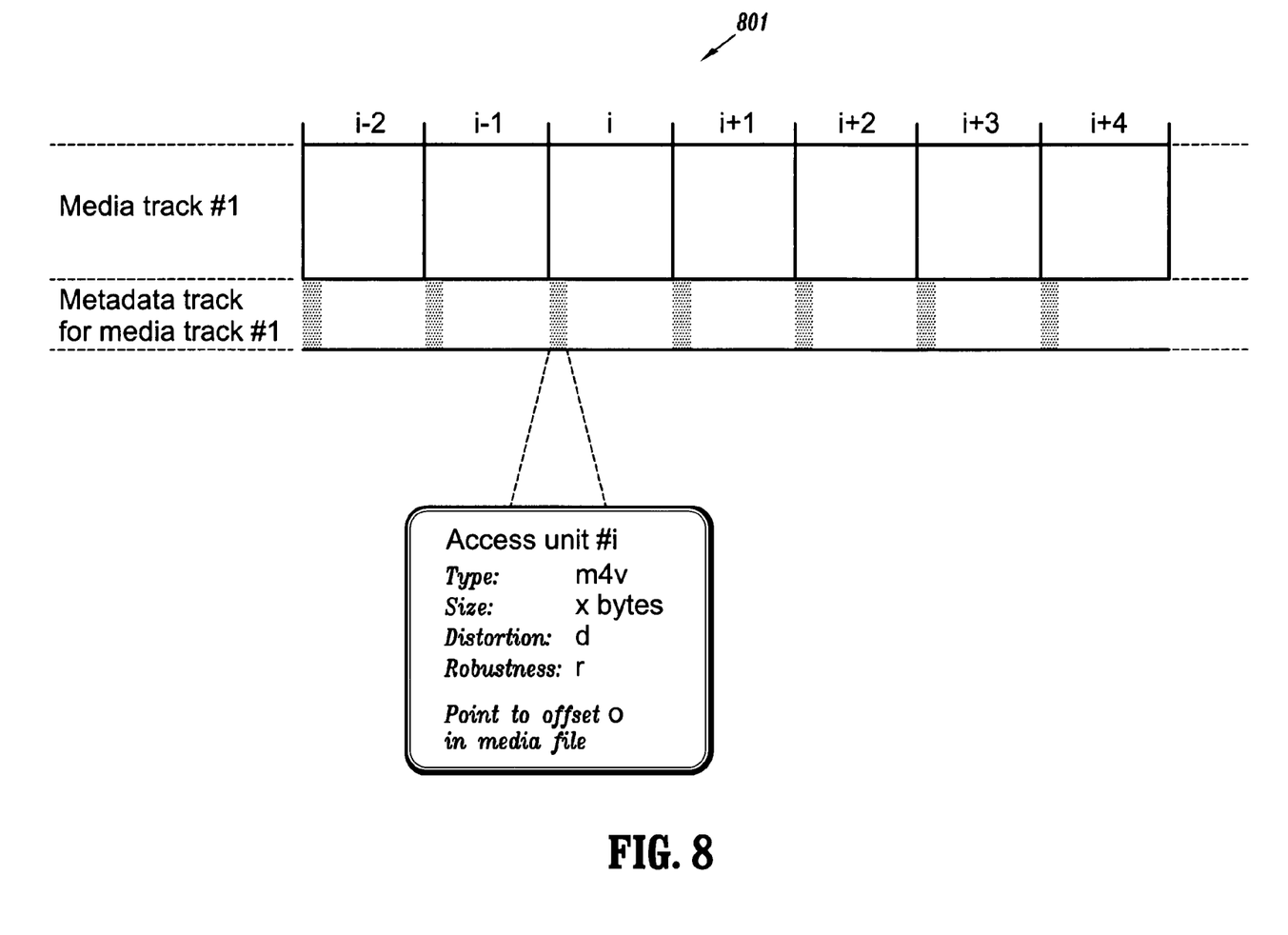
FIG. 8 shows a schematic set of sequential descriptions with metadata attached to every description, this metadata describing the description's properties.
Figure 9:
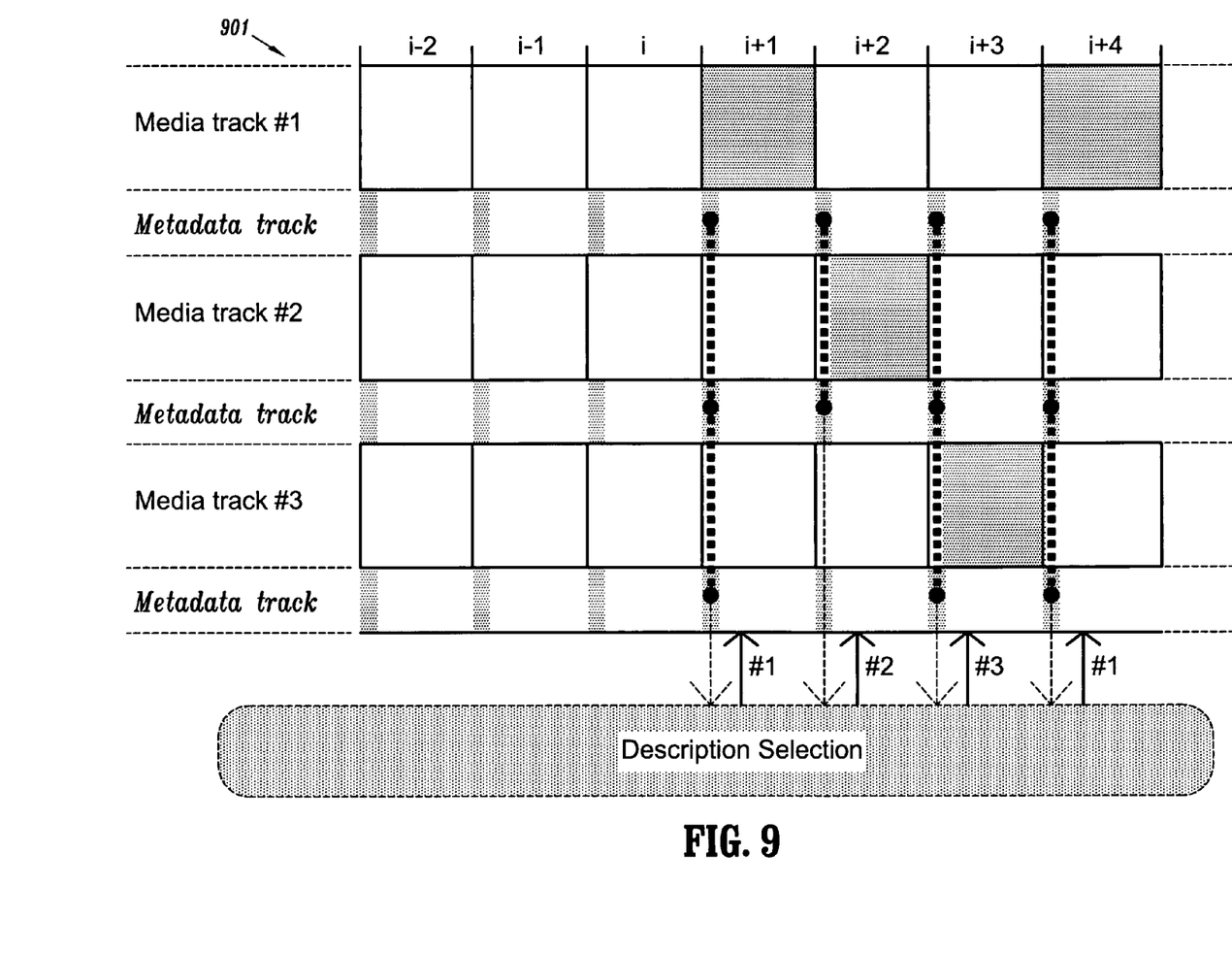
FIG. 9 shows a schematic set of sequential descriptions where a media server analyzes the metadata of all the descriptions pertaining to the access unit under consideration, and decides which description to send depending on the observed and/or calculated running conditions.
Figure 10:
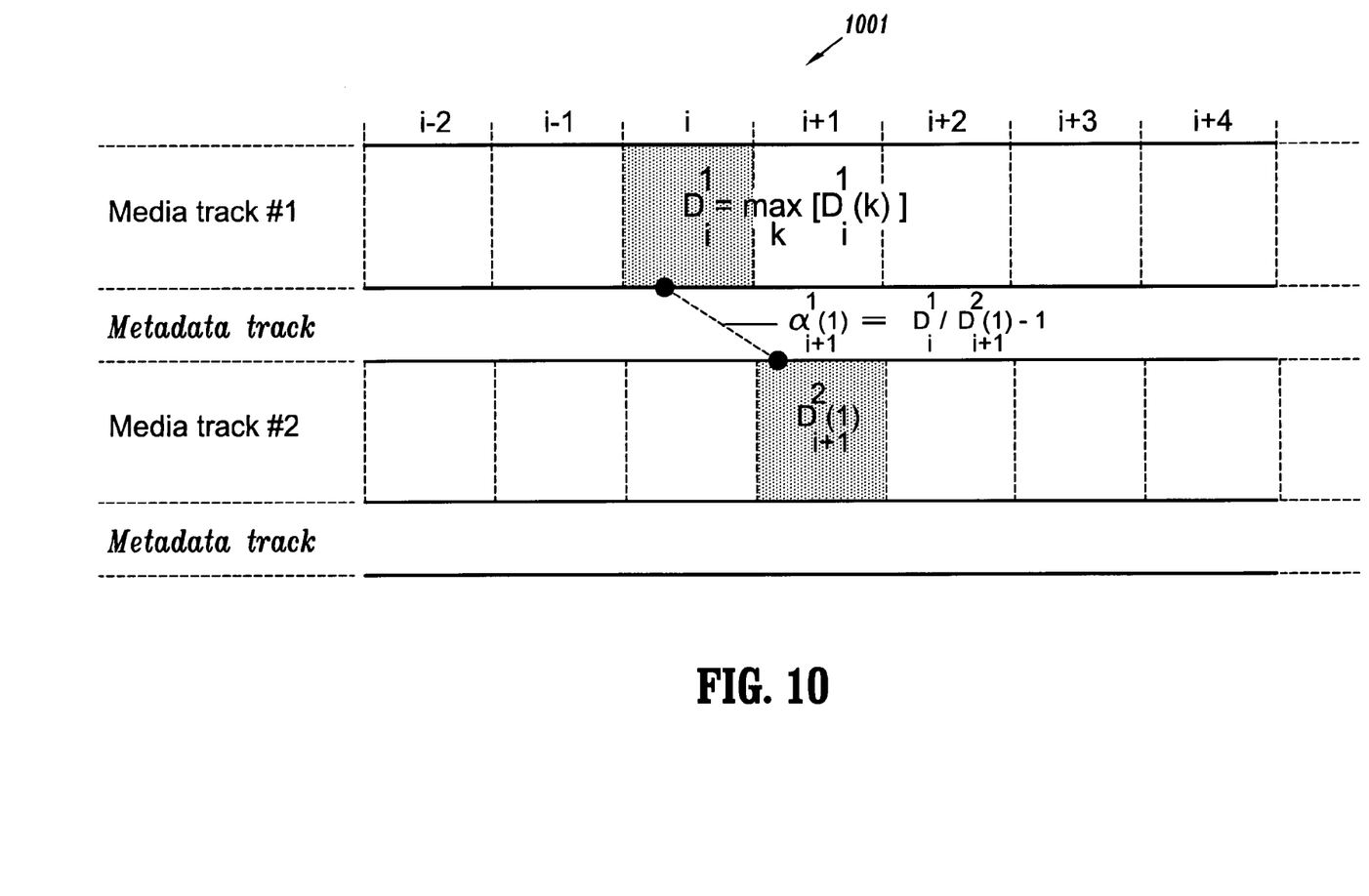
FIG. 10 shows a schematic set of sequential descriptions where $D_i^k(.)$ denotes $MSE(D_i^k)(:)$, and considering the access unit i+1, $N_i$=3 values are computed at description 2 denoted by $alpha_{i+1}^2(k)$ for k in [0, $N_i$, and these $N_i$ values are stored and the description j kept such that j=arg $max_k D_{i+1}^2(k)$, with the maximum distortion at time i+1 and description 2 denoted by $D_{i+1}^2$.

As shown in FIGS. 8 through 10, to be described together, operation of a preferred embodiment is described where a set of descriptions D is given for a particular video asset. Delta denotes the constant inter-frame interval. For example, a video sequence at 25 frames-per-second has a Delta of 1/25 s.

As shown in FIG. 8, a schematic set of sequential descriptions is indicated generally by the reference numeral 801. Metadata is attached to every description for describing the description's properties.

As shown in FIG. 9, a schematic set of sequential descriptions is indicated generally by the reference numeral 901, where a media server analyzes the metadata of all the descriptions pertaining to the access unit under consideration, and decides which description to send depending on the observed and/or calculated running conditions.

As shown in FIG. 10 a schematic set of sequential descriptions is indicated generally by the reference numeral 1001, where $D_i^k(.)$ denotes $MSE(D_i^k)(:)$, and considering the access unit i+1, $N_i$=3 values are computed at description 2 denoted by $alpha_{i+1}^2(k)$ for k in [0, $N_i$], and these $N_i$ values are stored and the description j kept such that $j=arg\ max_k\ D_{i+1}^2(k)$, with the maximum distortion at time i+1 and description 2 denoted by $D_{i+1}^2$.

Let $D_i^j$ denote the jth description of access unit i, with $0<=j<N_i$ and $0<=i<A$. For example, consider FIG. 9. All access units have 3 descriptions except access unit i+2, which has only 2 (i.e., $N_i$=3 for all I different than (i+2) and $N_{i+2}$=2). The vector of running constraints is defined as xc=[R(i)], where R(i) is the available channel rate at time i, in this exemplary embodiment. The running constraints vector may contain many more elements in alternate embodiments of the present disclosure.

The method of this preferred embodiment is composed of two parts: First we identify the description properties and suggest a method to compute their values. Next we suggest a method for a media server to efficiently use these properties given the current running constraints.

For the Description Properties, the vector of description properties is defined as p=[S, alpha], where S is the size in bytes of the description and alpha is a weighting factor taking possibly discrete values in the interval [−1 1], where the deviation is denoted in source distortion. We assume that the source distortion of a description at time i can be zero but cannot be more than twice as much as the distortion of a description at time i−1 in this example. The description properties vector may contain many more elements in alternate embodiments. In addition, the computation of alpha here and below is also merely exemplary.

The computation of the size S is straightforward. The computation of alpha (see FIG. 10) is as follows: Let the Mean Square Error (MSE) of description $D_i^j$ be represented by $MSE(D_i^j)$. For every access unit i, we compute the MSE distortion of every description $0<=j<N_i$ of access unit i given any previous descriptions $0<=j<N_{i-1}$ of access unit i−1. We define $MSE(D_{-1}^j)$=100 for all $0<=j<N_0$, and $N_{-1}$=1. We initialize $MSE(D_{-1}^j)$=100 for all $0<=j<N_{-1}$, and $N_{-1}$=1. We then compute $N_i \times N_{i-1}$ values for every access unit i. We denote these distortions by $MSE(D_i^j)(k)$, where k ranges from 0 to $N_{i-1}$. Next, we compute the parameter $alpha_i^j(k)$ by:

$$alpha_i^j(k)=MSE(D_i^j)(k)/MSE(D_{-1}^j)-1 \quad (1)$$

with k such that $0<=k<N_{i-1}$ and $MSE(D_{i-1}^j)=max_k\ (MSE(D_{i-1}^j)(k))$.

Therefore a description is fully described by $1+N_i \times N_{i-1}$ values, which are stored as side information (i.e. metadata).

For the Media Server, streaming media over the standard protocol RTP/RTCP is considered. The media server periodically receives an RTCP Receiver Report message that contains an evaluation of both the packet loss ratio and the round-trip time the connection experiences. We denote by rho and RTT this packet loss ratio and round-trip time, respectively. We compute R(i) as:

$$R(i)=(1.3 \times MTU)/(RTT \times sqrt(rho)) \quad (2)$$

where MTU is the packet size being used on the connection. At every access unit time instant i, the media server knows the description that has been selected at time i−1. We denote by k the index of this description. It then computes $N_i$ distortion values $D_i^j$ by $D_i^j=D_{i-1}^k(1+alpha_i^k)$. Finally the media server selects description k* at time i with the minimum distortion and such that the size $S_i^{k*}$ is lower than or equal to R(i)×Delta.

Accordingly, rate adaptation via access unit skipping is covered by the present disclosure, embodiments of which create an extra null description for all skippable access units. Preferred embodiment implementations of the present invention fully comply with the MPEG-4 family of standards, and may thereby be applied directly to MP4 client players such as Quicktime 6.0, the IBM JAVA player and Real One.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

The teachings of the present disclosure may be implemented as a combination of hardware and software. Moreover, the software is preferably implemented in firmware tangibly embodied on a program storage unit. The software may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the software, or any combination thereof, which may be executed by the hardware. In addition, various other peripheral units may be connected to the computer platform such as an additional data storage unit.

It is to be further understood that, because some of the constituent system components and methods showed in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method of streaming data over a communications network with varying streaming conditions, said method comprising:
    conditioning a data stream to generate a plurality of conditioned data representations of the data stream, wherein the conditioned data representations comprise different encoded representations of source data of the data stream each targeting a different set of running conditions, wherein conditioning comprises partitioning the data stream into a plurality of data units, and generating the different encoded representations of each of the data units of the data stream;
    packaging the plurality of conditioned data representations of the data steam together with metadata that specifies a target set of running conditions associated with the different encoded representations of the data stream, wherein the conditioned data representations are packaged by pre-computing one or more trajectories among the plurality of different encoded representations for each of the data units based on a given finite set of streaming conditions;
    observing a current run-time condition of a computing network; and
    dynamically selecting one of the packaged conditioned data representations for streaming over the computing network according to the running conditions specified in the metadata of the packaged conditioned data representations in view of the current run-time condition of the computing network.

2. A method as defined in claim 1 wherein dynamically selecting the most appropriate packaged conditioned data representation comprises selecting a most appropriate one of the pre-computed trajectories given the current run-time condition of the computing network.

3. A method as defined in claim 1 wherein packaging the plurality of conditioned data representations comprises using the metadata to determine a most appropriate trajectory among the different encoded representations of the data units whose properties are most compatible to the current run-time condition.

4. A method as defined in claim 3 wherein dynamically selecting the most appropriate packaged conditioned data representation comprises selecting the most appropriate trajectory among the different encoded representations of the data units given the current runtime condition.

5. A method as defined in claim 1 wherein said data stream comprises at least one of an audio stream and a video stream.

6. A method as defined in claim 1 wherein said computing network comprises a data network.

7. A method as defined in claim 1 wherein said data network comprises the Internet.

8. A method as defined in claim 1 wherein the current run-time condition comprises an available data channel bandwidth.

9. A method as defined in claim 1 wherein the current run-time condition comprises an observed data packet loss rate.

10. A method as defined in claim 1 wherein the current run-time condition comprises a packet loss ratio, a round-trip time a connection experiences, an available streaming server output bandwidth, or an available client consumption bandwidth.

11. A method as defined in claim 1 wherein the plurality of conditioned data representations each comprise a plurality of encoded representations of data units of the data stream.

12. A method as defined in claim 1 wherein said data stream comprises at least one of an audio stream and a video stream, the method further comprising simulating back-channel information about the connection by comparing at least one of the expected buffer usage rate and expected data consumption against at least one of the actual buffer usage rate and actual data consumption to determine at least one of the effective network congestion and packet delays.

13. A program storage device readable by machine, tangibly embodying a program of instructions executable by the machine to perform program steps for streaming data over a communications network with varying streaming conditions, the program steps comprising:
    conditioning a data stream to generate a plurality of conditioned data representations of the data stream, wherein the conditioned data representations comprise different encoded representations of source data of the data stream each targeting a different set of running conditions, wherein conditioning comprises partitioning the data stream into a plurality of data units, and generating the different encoded representations of each of the data units of the data stream;
    packaging the plurality of conditioned data representations of the data stream together with metadata that specifies a target set of running conditions associated with the different encoded representations of the data stream, wherein the conditioned data representations are packaged by pre-computing one or more trajectories among the plurality of different encoded representations for each of the data units based on a given finite set of streaming conditions;
    observing a current run-time condition of a computing network; and
    dynamically selecting one of the packaged conditioned data representations for streaming over the computing network according to the running conditions specified in the metadata of the packaged conditioned data representations in view of the current run-time condition of the computing network.

14. A program storage device as defined in claim 13 wherein the current run-time condition comprises an available data channel bandwidth, an observed data packet loss rate, or an available streaming server output bandwidth.

* * * * *